C. D. BEHAN AND G. G. PERRY.
REFRIGERATOR.
APPLICATION FILED JULY 6, 1921.

1,434,522.

Patented Nov. 7, 1922.
3 SHEETS—SHEET 1.

WITNESSES

INVENTORS
C. D. BEHAN
G. G. PERRY
BY
ATTORNEYS

C. D. BEHAN AND G. G. PERRY.
REFRIGERATOR.
APPLICATION FILED JULY 6, 1921.

1,434,522.

Patented Nov. 7, 1922.
3 SHEETS—SHEET 2.

WITNESSES

INVENTORS
C. B. BEHAN
G. G. PERRY
BY
ATTORNEYS

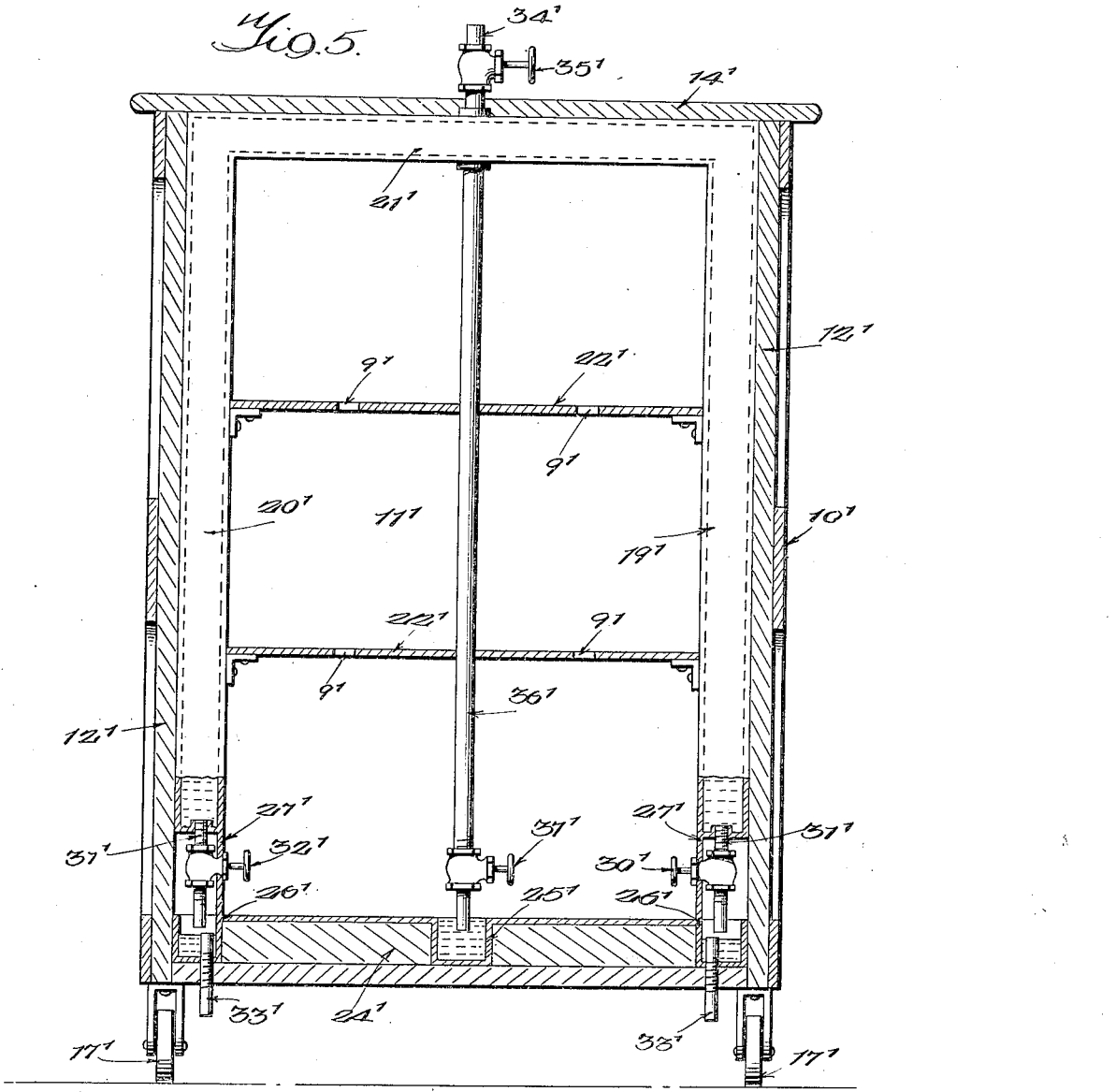

Patented Nov. 7, 1922.

1,434,522

UNITED STATES PATENT OFFICE.

CHARLES D. BEHAN AND GILBERT G. PERRY, OF STIGLER, OKLAHOMA.

REFRIGERATOR.

Application filed July 6, 1921. Serial No. 482,780.

*To all whom it may concern:*

Be it known that we, CHARLES D. BEHAN and GILBERT G. PERRY, citizens of the United States and residents of Stigler, in the county of Haskell and State of Oklahoma, have invented certain new and useful Improvements in Refrigerators, of which the following is a specification.

This invention relates to an improved refrigerator or cooling system therefor adapted to make use of the water of condensation and water of the melting ice, so as to refrigerate the interior of the chamber by the circulated water, in addition to the cooling action of the ice, thus economizing the use of ice, while maintaining the interior temperature of the refrigerator, ice box or the like, and more especially the provision chambers thereof at a lower temperature, whereby food products may be maintained in a fresh and sanitary condition.

Another object of the invention is to provide a refrigerator and cooling means therefor embodying a siphon which may be easily started and controlled, provisions being made for conveying or circulating the water from the melted ice suitably positioned in the refrigerator, around and between the walls thereof for the purpose of reducing the temperature of the provision chamber or chambers, said structure being of novel and simple character, whereby the refrigerator may be very economically produced and will not be likely to get out of working order.

Other and further objects of our invention will become readily apparent to persons skilled in the art, from a consideration of the following description when taken in conjunction with the accompanying drawings, wherein:—

Figure 5 is a vertical cross section showing a modified form of the invention.

Figure 1:
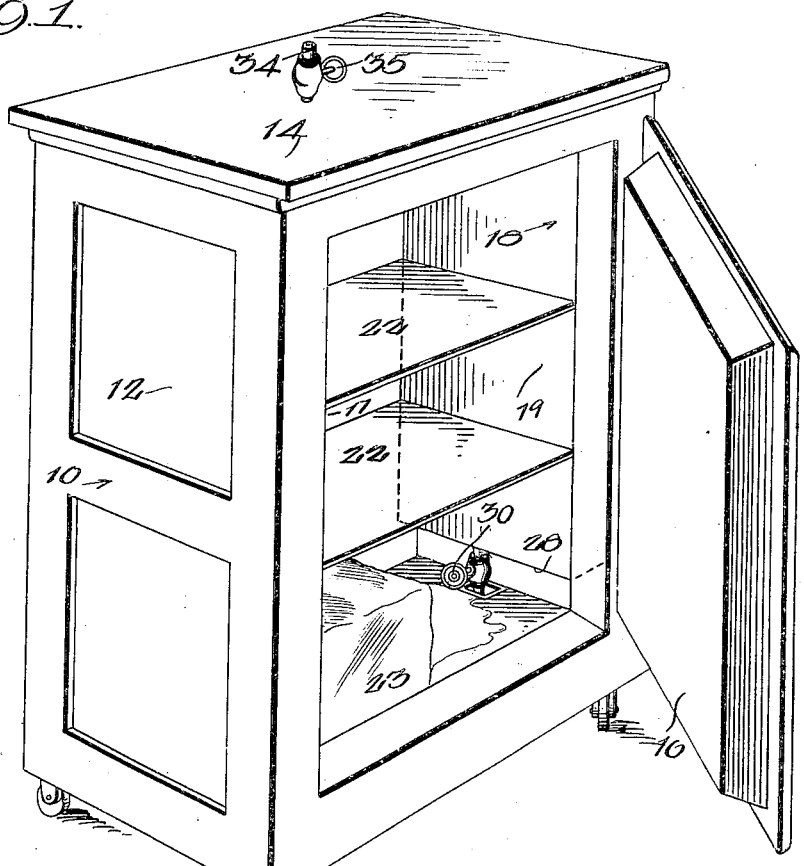
Figure 1 is a perspective view of a refrigerator constructed in accordance with the invention.
Figure 4:
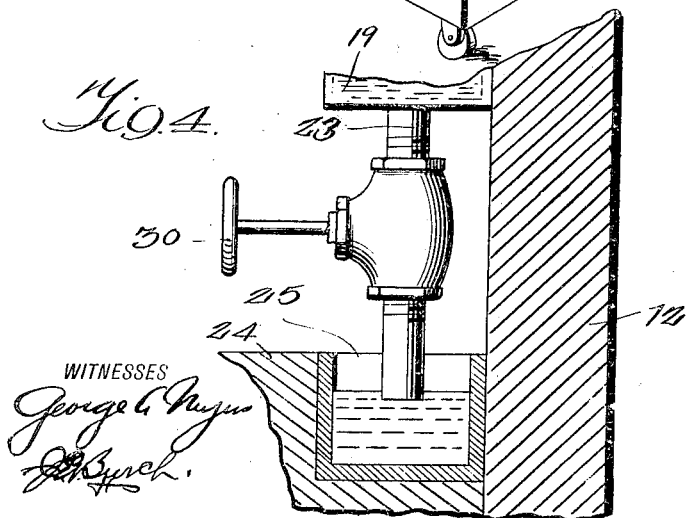
Figure 4 is an enlarged detail fragmentary vertical sectional view showing the outlet end of the siphon employed as a part of the refrigerating system.
Figure 2:
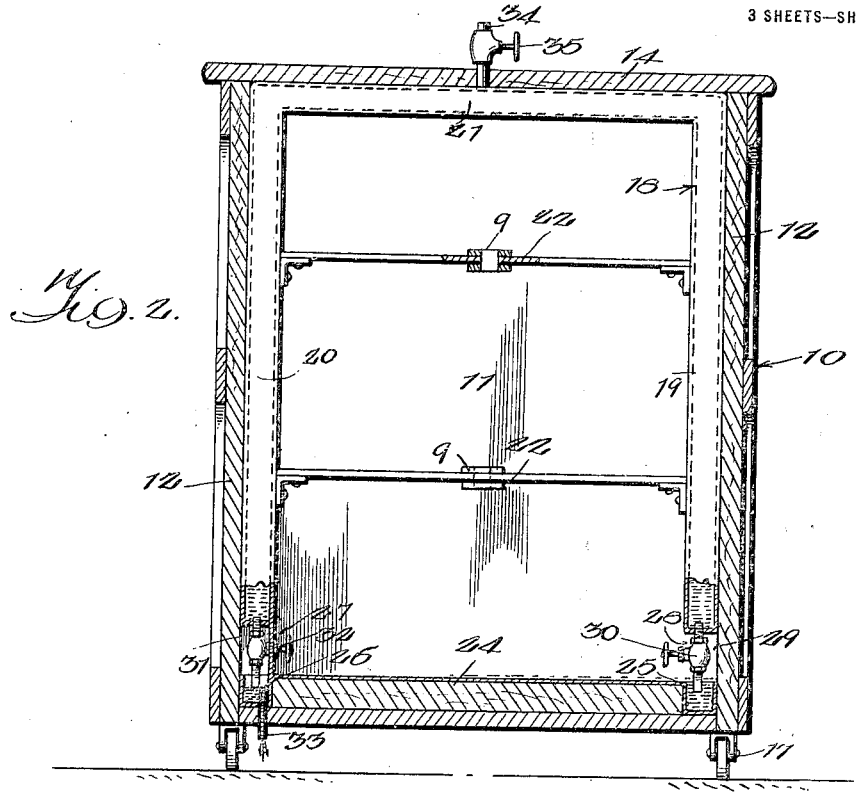
Figure 2 is a vertical cross section thereof taken centrally.
Figure 3:
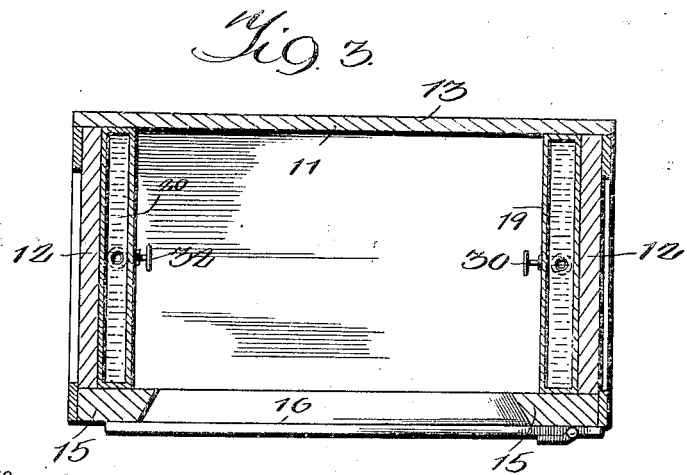
Figure 3 is a transverse horizontal sectional view.

Referring to the drawings in detail, in which like reference characters designate corresponding parts throughout the several views, the numeral 10 designates a refrigerator or ice box producing an enclosed series of provision chambers or the like 11, said enclosure having the side walls 12, back wall 13, top 14, bottom 15 and front door or closure 16 provided with suitable means for retaining the same in a closed position. The refrigerator may also be mounted upon the castors 17 in the usual manner.

The foregoing constitutes no part of the invention per se, as the refrigerator or ice box may be of any known or preferred construction, as the invention consists of the cooling or refrigerating apparatus per se and in combination with the refrigerator of which it may form a part or relative to which, it may constitute a separate appliance fitted thereto. The refrigerator constitutes spaced walls of the usual or any preferred construction which may be produced by a siphon in the form of an inverted or U-shaped or tortuous jacket 18 having side portions 19 and 20 and a top portion 21 connecting the same, the side portions 19 and 20 constituting the legs of the siphon for use in the manner of a bent pipe or tube for drawing off liquids from a higher to a lower level as is common in the art of siphons. In order that this principle may be embodied in the construction of a refrigerator. In the present instance the side portions or legs 19 and 20 are made of the same length for a purpose to be hereinafter set forth, bearing in mind that it would not be possible to retain the water in the siphon if one leg was longer than the other. However, it is to be understood that the jacket may be in the form of a shank or shell, or in the form of pipes arranged to circulate through the refrigerator or ice box, the jacket constituting the space between the inner and outer walls of the ice box or suitably lined for this purpose, as is common in the art, where said space is filled with suitable heat excluding means or made in the form of a vacuum for the purpose of maintaining a low interior temperature, but without efficient results.

In the present embodiment, a series of shelves 22 are arranged in the refrigerator and the ice indicated at 23 is designed to be supported upon the bottom portion 24, the bottom chamber constituting the ice chamber, a pipe or flue 9 connecting the ice chamber with the provision chamber, if desired.

A cup 25 is inset in the bottom portion 24 at one side of the bottom or ice chamber and receives the water from the melted ice. At the opposite side of the refrigerator from the cup 25, a second cup 26 is arranged and is shut off from the bottom or ice chamber by a wall 27, so that the drip water cannot flow directly into the cup 26. The legs 19 and 20 of the jacket 18 forming a siphon, as heretofore explained, are of equal length, but the leg 19 forms the short leg by reason of the water from the melting ice flowing into the cup 25 so that the short leg or leg 19 is in direct communication with the siphon and the outlet in the long leg or leg 20 communicates with the drip water tank or water supply only through the siphon. Preferably the cups are arranged at exactly the same level but as the cup 25 receives the water from the ice chamber the level of the liquid in this cup is frequently higher than the level of the liquid in the cup 26 as will be hereinafter more fully described. If desired, one of the cups may be disposed at a different level from that of the other with a corresponding shortening of one side portion of the jacket 18 and elongation of the other side portion thereof.

At the lower end of the side portion 19 is disposed a valved pipe connection 29, the valve thereof being indicated at 30, while in the non-communicating chamber produced between the lower end of the side 20 and the cup 26 there is provided a valved outlet pipe 31, the valve of which is designated at 32, both valves being adapted to be operated from the interior of the refrigerator and more especially the ice compartment. It is obvious that the valves 30 and 32 may be omitted and in lieu thereof plugs or stoppers may be inserted in the lower ends of the pipes 29 and 31 when desired. The cup 26 is also provided with an outlet or drain 33 discharging into a pan or drain pipe to a down spout, waste pipe or sewer, as is common in the art. At the top and preferably centrally of the portion 21, is disposed an inlet or filling tube or funnel 34 provided with a valve 35 whereby the same may be controlled. It will be noted that water seals are produced by the pipes 29 and 31 dipping into the water in the cups 25 and 26 respectively, the first named producing an inlet for the siphon or siphon jacket and the second producing an outlet therefor, the inlet being disposed to receive the water from the ice compartment or chamber directly while the outlet is shut off from the ice chamber so that the water from the melted ice can only flow to the cup or seal trap 25, and not directly to the cup 26, which communicates therewith only through the siphon.

In the operation of the device, the valves 30 and 32 are closed. The valve 35 is then opened and the pipes constituting the circulating system are filled with water through the inlet 34, a funnel or other means being employed for this purpose, or said inlet may be connected in any suitable manner with a water supply pipe to fill the jacket as desired. The valve 35 is then closed and the valves 30 and 32 opened. As the water from the ice chamber flows into the cup 25, the water in this cup 25 rises to a level sufficiently higher than the water level in the cup 26 to cause the water to siphon from the cup 25 to the cup 26 and in doing this to circulate through the jacket 18. In flowing from the cup 25 the water passes through the valved pipe connection 29 into the side portion 19 of the jacket across the connecting portion 21 thereof and down the side portion 20 into the valved pipe connection 31 and thence into the cup 26. The drain pipe 33 connects with the cup 26 in such manner as to prevent the water in this cup from exceeding a certain level and may effect the purpose either by virtue of the point or manner of its connection with the cup or by the aid of a float or weight control valve mechanism regulating the flow through the drain pipe and associated with the cup 26.

It is to be understood that brine or other refrigerating medium may be used in lieu of water, if desired. However, it is to be understood that the important feature of the invention consists in using the water from the melting ice, which water will flow or drain into the cup 25 and thereby circulate through the jacket as long as the ice lasts and maintains the water in the cup 25 at a higher level than the water in the cup 26. In this way, a continuous circulation of cold water entirely around the provision chamber of the ice box is insured, thereby maintaining the same at a uniform low temperature and thereby resulting in a saving of ice owing to the fact that the temperature is maintained at a lower degree than usual with the ice alone, and where the water drains directly from the refrigerator. It will be understood that any form of water seal, such as the usual U-shaped form, may be employed in lieu of the pipes dipping into the cup, so long as the water is supplied to one and not to the other, except by circulating through the jacket, the action of the siphon serving to carry all of the water from the melted ice, as well as water of condensation in the ice chamber, away and to discharge the same through the drain pipe 33. However, when the ice has melted and the water supply exhausted, the seals will maintain the water in the jacket or siphon, as it is thought will be readily understood, thus continuing to refrigerate the interior or provision chamber, until the ice has been replenished. It will also be obvious that the device may be applied to refrigerators or ice boxes having a door in the front or at the top, and which are of rectangular, round or other cross section and that the jacket or siphon may be produced between spaced walls of the refrigerator or pipes circulated through the same, so as to entirely or partially surround the walls or to cover the interior exposed area. The ice chamber may also be located at the bottom or at the top, or in any other suitable place so long as the water therefrom is discharged into one of the cups or seals for the purpose of circulating the cold water through the pipe in the manner described. It is obvious that a pipe can lead from the bottom of the ice compartment into siphon at the top, this arrangement will not only do away with the inlet 25 arrangement, but will cause the cold water to enter at the top of siphon. This form of the invention is shown in Figure 5, the structure of the refrigerator being the same, except the parts are designated by prime marks, and the seals or cups 25' and 26" are shut off from the bottom of the ice chamber, that is, in which the drippings are discharged or run, by means of walls 27', both cups or seals 26' and 26" being provided with a drain or drip pipe 33' as in the described form or construction. A cup or seal 25' is provided centrally at the bottom and has dipping in the same and extending upwardly therefrom a pipe or leg 36' connected or communicating with the top or connecting portion 21' at the top, and provided at the bottom with a valve 37' or otherwise equipped to cut off or open the lower end of the pipe 36' constituting the inlet of the siphon. In the operation of this form, the cups 26' and 26" are the outlets through the legs or ends 19' and 20', while the inlet is the cup 25' and leg or end 36'. In use, the valves 30', 32' and 37' are closed, and the valve 35' opened, so that the jacket or siphon may be filled with water through the inlet or filling tube or funnel 34'. The valve 35' is then closed, and subsequently the valves 30', 32' and 37' are opened, so that as the ice melts and the water drips or runs into the cup 25', together with the water of condensation, a circulation is set up in the system and the overflow from the cups or seals 26' and 26" drains out through the drip pipe 33'. The partitions or walls 27' separate the cups 26' and 26" from the ice compartment, so that while the short end or leg 36' is in direct communication with the siphon and drip water flow, the outlets, or long ends or legs 19' and 20', communicate with the drip water tank or water supply only through the siphon. Ports 9' are cut or otherwise provided in the partitions or shelves to form pipes or flues to connect the ice chamber with the provision chambers, so that the air may circulate therein, thus increasing the efficiency of the system.

In view of the foregoing, it is thought that the operation of the device will be readily understood and in view of the simplicity and practical value, that it will readily commend itself to those skilled in the art.

Having thus described our invention what we claim is:—

1. In a refrigerator, a siphon extending along the side and top walls of the same within the refrigerator and having a large heat absorbing surface presented to the provision chamber, seals at the lower ends of said siphon and one being disposed to receive the water from the melted ice and being in direct communication therewith and the other, communicating therewith only through the siphon means for filling said siphon, means for cutting off communication between the seals and the ends of the siphon, and means, valve controlled, for filling said siphon initially, the seal at the discharge side being provided with a drain adapted to maintain the water level therein lower than the water level in the other seal.

2. In a refrigerator, a siphon extending along the inside of the side and top walls of the same, seals at the lower ends of said siphon and one being disposed to receive the water from the melted ice, one leg of the siphon being in direct communication therewith and the other leg constituting the outlet being in communication therewith only through the siphon, means for filling said siphon, means for cutting off communication between the seals and the ends of the siphon, and means valve controlled for filling said siphon initially, the seal at the discharge side of the siphon communicating with the seal at the inlet side of the siphon only through the siphon, the water from the ice in the ice chamber flowing to the seal at the inlet side for circulation through the siphon together with the water of condensation, and a drain leading from said seal at the discharge side.

3. In a refrigerating system for refrigerators or the like, a siphon arranged to circulate water around the inner surface of the provision chamber of the refrigerator and having means for supplying a refrigerating liquid thereto to fill the same, said siphon having bottom seals, one of which is designed to receive the water from the melted ice in the ice chamber of the refrigerator and to circulate the same, the water level in the seal at the inlet side being higher than the water level in the seal at the discharge side.

4. In a refrigerating system for refrigerators or the like, a siphon arranged to circulate water around the inner surface of the provision chamber of the refrigerator and having means for supplying a refrigerating liquid thereto to fill the same, said siphon having bottom seals, means for supplying the water from the melted ice to the seal at the inlet side of the siphon; a drain at the discharge side of the siphon adapted to maintain the water level therein lower than the level at the inlet side, and means for controlling the lower ends of the siphons to open or close the same.

5. In combination with a refrigerator having an ice chamber and cups imbedded in the bottom of the provision chamber of the refrigerator, one being provided with an outlet pipe, a jacket arranged around the interior of said chamber to receive a supply of cold water, a pipe at the lower end of one side of said jacket and dipping in said cup at that side, said supply flowing to said last named cup to maintain the water therein at a higher level than the water level in the cup at the discharge side, a valve controlling said pipe, a valve inlet at the top of the jacket for filling the latter, a wall between the lower end of the other side of the jacket at the bottom of the chamber, a pipe dipping into the other cup from said end, a valve controlling said pipe, and shelves arranged interiorly of the jacketed chamber.

6. In a refrigerating system for refrigerators or the like, a siphon arranged to circulate water around the inner surface of the provision chamber of the refrigerator having means for supplying a refrigerating liquid thereto to fill the same, the ends of the siphon being of the same length, said siphon having bottom seals, means for supplying the water from the melted ice to the seal at the inlet side of the siphon, a drain at the discharge side of the siphon adapted to maintain the water level therein lower than the level at the inlet side, and means for controlling the lower ends of the siphon to open or close the same.

CHARLES D. BEHAN.
GILBERT G. PERRY.